United States Patent [19]

Kennedy et al.

[11] Patent Number: 5,024,795
[45] Date of Patent: * Jun. 18, 1991

[54] METHOD OF MAKING SHAPED CERAMIC COMPOSITES

[75] Inventors: Christopher R. Kennedy; Marc S. Newkirk, both of Newark, Del.

[73] Assignee: Lanxide Technology Company, LP, Newark, Del.

[*] Notice: The portion of the term of this patent subsequent to Apr. 25, 2006 has been disclaimed.

[21] Appl. No.: 280,717

[22] Filed: Dec. 6, 1988

Related U.S. Application Data

[63] Continuation of Ser. No. 207,924, Jun. 13, 1988, Pat. No. 4,824,622, which is a continuation of Ser. No. 945,404, Dec. 22, 1986, abandoned.

[51] Int. Cl.$^5$ .................. C04B 33/32; C04B 35/60
[52] U.S. Cl. ........................ 264/59; 264/60; 264/82
[58] Field of Search ............ 264/57, 59, 60, 65, 264/82; 501/98, 127, 128

[56] References Cited

U.S. PATENT DOCUMENTS

| | | | |
|---|---|---|---|
| 2,741,822 | 4/1956 | Udy | 264/59 |
| 3,255,027 | 9/1966 | Talsma | 106/65 |
| 3,296,002 | 1/1967 | Hare | 106/10 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church et al. | 264/60 |
| 3,864,154 | 2/1975 | Gazza et al. | 264/60 |
| 3,973,977 | 8/1976 | Wilson | 106/62 |
| 4,055,451 | 10/1977 | Cockbain et al. | 264/60 |
| 4,647,414 | 3/1987 | Mizuno et al. | 264/65 |
| 4,657,876 | 4/1987 | Hillig | 264/60 |

FOREIGN PATENT DOCUMENTS 0116809 8/1984 European Pat. Off. .
0155831 9/1985 European Pat. Off. .
0169067 9/1986 European Pat. Off. .

OTHER PUBLICATIONS

"Oxidation of Molten Aluminum Alloys. Reaction with Refractories" by M. Drouzy and M. Richard—Mar. 1974—Fonderie, France No. 332, pp. 121-128.
"Refractories for Aluminum Alloy Melting Furnaces" by B. Clavaud and V. Jost, Sep. 1980-Trans. Lillian Brassinga Jan. 1985.

Primary Examiner—James Derrington
Attorney, Agent, or Firm—Mark G. Mortenson; William E. McShane; Michael K. Boyer

[57] ABSTRACT

The present invention provides a method for producing a self-supporting ceramic composite by the oxidation of a parent metal to form a polycrystalline ceramic material consisting essentially of the oxidation reaction product of the parent metal with an oxidant, including a vapor-phase oxidant, and, optionally, one or more metallic constituents. A permeable filler material, such as a preform, with at least one surface bearing a permeable stratum, is contacted with a body of molten parent metal heated to a temperature above its melting point but below the melting point of the oxidation reaction product. At least a portion of the oxidation reaction product is maintained in contact with and between the molten metal and oxidant to transport the molten metal through the oxidation reaction product toward the permeable stratum and into contact with the oxidant so that the oxidation reaction product continues to form at the interface between the oxidant and previously formed oxidation reaction product that has infiltrated the filler material. The reaction is continued to infiltrate at least a portion of the stratum with the oxidation reaction product and to produce an intermediate ceramic body having an adjacent ceramic composite overlaid with a ceramic stratum. The ceramic stratum is removed from the underlying ceramic composite to produce a self-supporting ceramic composite having the surface established by the permeable stratum.

8 Claims, 1 Drawing Sheet

METHOD OF MAKING SHAPED CERAMIC COMPOSITES

This is a continuation of co-pending application Ser. No. 207,924 filed on June 13, 1988, now U.S. Pat. No. 4,824,622 which in turn is a continuation of U.S. application Ser. No. 945,404 filed on Dec. 22, 1986, now abandoned.

FIELD OF THE INVENTION

This invention broadly relates to methods for producting self-supporting ceramic composites. More particularly, this invention relates to methods of making self-supporting ceramic composites by the directed growth of an oxidation reaction product of a parent metal into a permeable mass of filler material and into an adjacent permeable stratum outwardly disposed to the mass of filler, such that the resulting composite stratum has a mechanical integrity weaker than the resulting composite mass of filler and is separable therefrom, thereby establishing a boundary to the infiltrated mass.

DESCRIPTION OF COMMONLY OWNED PATENT APPLICATIONS AND BACKGROUND

The subject matter of this application is related to copending and Commonly Owned U.S. Patent Applications, which include the following: Ser. No. 818,943, filed Jan. 15, 1986, which issued on Dec. 15, 1987, as U.S. Pat. No. 4,713,360 and its ancestor applications (now abandoned), all in the name of Marc S. Newkirk et al. and entitled "Novel Ceramic Materials and Methods for Making the Same". These applications disclose the method of producing self-supporting ceramic bodies grown as the oxidation reaction product from a parent metal precursor. Molten parent metal is reacted with a vapor-phase oxidant to form an oxidation reaction product, and the metal migrates through the oxidation reaction product toward the oxidant thereby continuously developing a polycrystalline ceramic body of the oxidation reaction product. The ceramic body can be produced having metallic components and/or porosity, which may or may not be interconnected. The process may be enhanced by the use of an alloyed dopant, such as in the case of an aluminum parent metal oxidized in air. This method was improved by the use of external dopants applied to the surface of the precursor metal as disclosed in Commonly Owned and Copending U.S. patent application Ser. No. 220,935, filed June 23, 1988, which issued on Aug. 1, 1989, as U.S. Pat. No. 4,853,352, which is a continuation of Application Ser. No. 822,999, filed Jan. 27, 1986, and its ancestor applications (now abandoned), all in the name of Marc S. Newkirk et al. and entitled "Methods of Making Self-Supporting Ceramic Materials".

The subject matter of this application is also related to that of Commonly Owned and Copending U.S. patent application Ser. Nos. 819,397, which issued on July 25, 1989, in U.S. Pat. No. 4,851,375 filed Jan. 17, 1986, which is a continuation-in-part of Ser. No. 697,876, filed Feb. 4, 1985 (now abandoned), both in the name of Marc S. Newkirk et al. and entitled "Composite Ceramic Articles and Methods of Making Same". These applications and patents disclose a novel method for producing self-supporting ceramic composites by growing an oxidation reaction product from a parent metal into a permeable mass of filler, thereby infiltrating the filler with a ceramic matrix.

Further developments of the foregoing methods enable the formation of ceramic composite structures which (1) contain therein one or more cavities which inversely replicate the geometry of a shaped precursor parent metal, and (2) have a negative pattern which inversely replicates the positive pattern of a parent metal precursor. These methods are described, respectively, (1) in Commonly Owned U.S. patent application Ser. No. 823,542, which issued on May 9, 1989, as U.S. Pat. No. 4,828,785 filed Jan. 27, 1986, in the name of Marc S. Newkirk et al., entitled "Inverse Shape Replication Method of Making Ceramic Composite Articles and Articles Obtained Thereby", and (2) in Commonly Owned U.S. patent application Ser. No. 896,157, filed Aug. 13, 1986, which issued on Aug. 22, 1989, as U.S. Pat. No. 4,859,640, in the name of Marc S. Newkirk and entitled "Method of Making Ceramic Composite Articles with Shape Replicated Surfaces and Articles Obtained Thereby."

A feature useful in the methods of the above-mentioned Commonly Owned Patent Applications and patents to produce a net shape ceramic body, including composite bodies which retain essentially the original shape and dimensions of the filler or preform, is to minimize or inhibit ceramic matrix overgrowth of defined surface boundaries. Overgrowth of the surface boundaries can be substantially prevented by controlling the infiltration of the polycrystalline ceramic matrix to any defined surface boundaries, which may be accomplished such as by using a predetermined quantity of parent metal, establishing within the preform more favorable oxidation kinetics than those outside the preform, exhausting the oxidizing atmosphere at some point in the process, or lowering the reaction temperature at some point in the process. Any of these steps may require close control or vigilance to obtain essentially no polycrystalline overgrowth of any defined surface boundary, and still may not produce the most desirable net or near net shape, or may require additional machining or finsihing to create acceptable tolerances in a finished part.

Methods were developed of making ceramic composite structures having a pre-selected shape or geometry. These methods include the utilization of a shaped preform of permeable filler into which the ceramic matrix is grown by oxidation of a parent metal precursor, as described in Commonly Owned U.S. patent application Ser. No. 338,471, filed on Apr. 14, 1989, as a continuation of U.S. patent application Ser. No. 861,025, filed May 8, 1986, both in the names of Marc S. Newkirk et al. and entitled "Shaped Ceramic Composites and Methods of Making the Same". Another method of making such shaped ceramic composites includes the utilization of barrier means to arrest or inhibit the growth of the oxidation reaction product at a selected boundary to define the shape or geometry of the ceramic composite structure. This technique is described in Commonly Owned U.S. Pat. No. 4,923,832, which issued on May 8, 1990, from U.S. patent application Ser. No. 861,024, filed May 8, 1986, in the names of Marc S. Newkirk et al. and entitled "Method of Making Shaped Ceramic Composites with the use of a Barrier".

The entire disclosures of all of the foregoing Commonly Owned U.S. Patents and Patent Applications are expressly incorporated herein by reference.

The present invention provides another method for establishing a surface boundary on a ceramic composite which is desirable in forming net shape ceramic composites, particularly with larger, single-piece bodies or bodies with complicated geometry.

SUMMARY OF THE INVENTION

The present invention broadly provides a method for producing a self-supporting ceramic composite comprising a mass of filler material, such as a shaped preform, infiltrated by a ceramic matrix obtained by the oxidation reaction of a parent metal to form a polycrystalline matrix material consisting essentially of the oxidation reaction product of the parent metal with one or more oxidants, including a vapor-phase oxidant, and, optionally, one or more metallic constituents. The self-supporting ceramic composite has a surface boundary, perimeter, or the like, established by first providing on at least one surface of the mass of filler material a permeable stratum or coating. The oxidation reaction process is continued to permit development or growth of the oxidation reaction product beyond the surface and into the stratum. This stratum with overgrowth of the matrix material beyond the mass of filler is predetermined or predesigned to be structurally weaker than the underlying composite of infiltrated mass of filler, and can be easily mechanically removed or separated. Upon removal of this stratum containing this overgrowth from at least a portion of the surface, there remains the exposed surface of the resulting composite in a predetermined shape.

More particularly with respect to the method of the present invention, a self-supporting ceramic composite is produced by contacting a zone portion or extended surface of a mass of filler material with a body of molten metal obtained by heating a parent metal to a temperature above its melting point but below the melting point of the oxidation reaction product. The mass of filler may have a predetermined form or shape, either as a shaped preform bearing or surrounded by the permeable stratum as in the form of a loose bedding or coating, or by configuring the stratum with a shaped surface which is then brought into engagement with a mass of loose, conformable filler. At the aforedescribed temperature or within this temperature range, the molten metal reacts with a vapor-phase oxidant to form the oxidation reaction product. The vapor-phase oxidant may be used in conjunction with a solid oxidant or a liquid oxidant, as explained below in greater detail. The mass of filler material has at least one surface with a stratum or coating of a material in conforming engagement with the surface, and the stratum is at least partially spaced from the contacting zone such that formation of the oxidation reaction product will occur into the mass of filler material and in a direction towards and at least partially into the stratum. At least a portion of the oxidation reaction product is maintained in contact with and between the molten metal and the oxidant, to draw molten metal through the oxidation reaction product towards the oxidant such that the oxidation reaction product continues to form at the interface between the oxidant and previously formed oxidation reaction product that has infiltrated the mass of filler material thereby forming a composite. The reaction is continued to permit growth beyond the surface and into the stratum until at least a portion of the stratum has been infiltrated with the oxidation reaction product, thereby producing an intermediate ceramic body comprising the ceramic stratum and underlying ceramic composite, with the predetermined interface between the two defining the boundary or surface for the end-product. The stratum containing this overgrowth is predesigned to be structurally or mechanically weaker than the underlying composite. The relative mechanical integrities between the two layers is predetermined as by a choice of materials and/or composition of the filler and the stratum, the array of these materials, the oxidation reaction product and its affinity for these materials, and one or more process conditions. This intermediate ceramic body, comprising the infiltrated stratum and adjacent composite, typically is cooled, and the ceramic stratum is removed or separated from the underlying composite by any suitable mechanical means to produce a self-supporting ceramic composite having the defined surface established by the interface between the stratum and the infiltrated mass of filler.

The composite articles of this invention can be grown with substantially uniform properties throughout their cross-section to a thickness heretofore difficult to achieve by conventional processes for producing dense ceramic structures. The process which yields these products also obviates the high costs associated with conventional ceramic production methods, including fine, high purity, uniform powder preparation, and densification by sintering, hot pressing and/or hot isostatic pressing.

The products of the present invention are adaptable or fabricated for use as articles of commerce which, as used herein, is intended to include, without limitation, industrial, structural and technical ceramic bodies for such applications where electrical, wear, thermal, structural, or other features or properties are important or beneficial; and is not intended to include recycle or waste materials such as might be produced as unwanted by-products in the processing of molten metals.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents derived from the parent metal or produced from the oxidant or by dopant, most typically within a range of from about 1-40% by volume, but may include still more metal.

"Oxidation reaction product" generally means one or more metals in any oxidized state wherein a metal has given up electrons to or shared electrons with another element, compound, or combination thereof. Accordingly, an "oxidation reaction product" under this definition includes the product of reaction of one or more metals with an oxidant.

"Oxidant" means one or more suitable electron acceptors or electron sharers and may be an element, a combination of elements, a compund, or a combination of compounds, including reducible compounds, and is vapor, solid, or liquid at the process conditions.

"Parent metal" refers to that metal, e.g., aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context.

DETAILED DESCRIPTION OF THE INVENTION AND PREFERRED EMBODIMENTS

Figure 1:
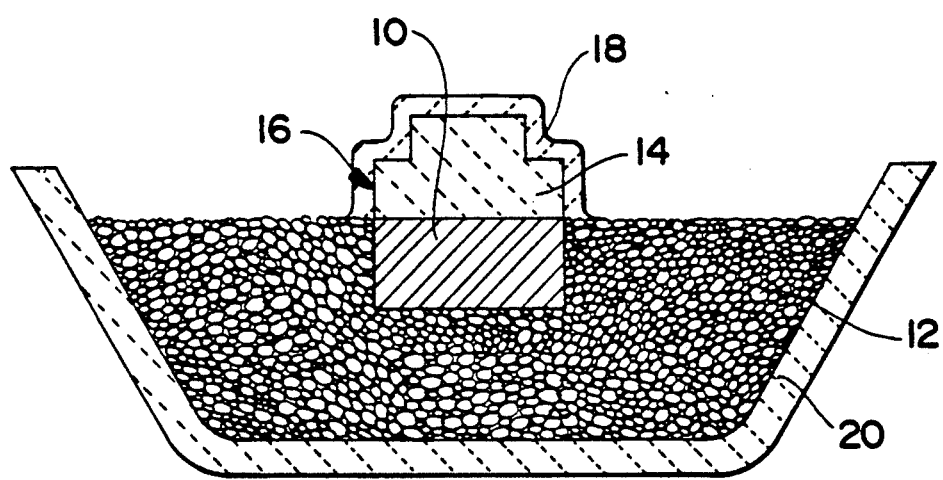
FIG. 1 is a schematic, vertical cross-sectional view showing an assembly of a parent metal ingot in a suitable bedding overlaid by a preform bearing a permeable stratum, and confined within a refractory vessel.

In accordance with a preferred embodiment of the present invention, the parent metal, which may be doped (as explained below in greater detail) and is the precursor to the oxidation reaction product, is formed into an ingot, billet, rod, plate, or the like, and placed in an inert bed, crucible, or other refractory container. A permeable shaped preform (described below in greater detail) is formed or manufactured such as to have at least one defined surface boundary and to be permeable to the vapor-phase oxidant and to the infiltration oxidation reaction product. The preform is placed adjacent to and preferably in contact with one or more surfaces of, or a portion of a surface of, the parent metal such that at least a portion of the defined surface boundary of the preform is generally positioned distantly or outwardly or spaced from the metal surface of the parent metal. The preform preferably is in contact with an areal surface of the parent metal; but when desired, the preform may be partially immersed, but not totally immersed, in the molten metal because complete immersion would cut off or block development of the polycrystalline matrix.

A permeable stratum is formed, applied or spread as a coating or layer onto the preform to have at least one surface that is substantially conformable to the geometry of the defined surface boundary of the preform. The stratum is sufficiently porous to be permeable to the vapor-phase oxidant and to the infiltrating oxidation reaction product. The permeable stratum, which need not be uniform in thickness, has its conformed surface contiguous with, or bearing against, the defined surface boundary of the preform. Formation of the oxidation reaction product will occur in a direction towards the defined surface boundary and the permeable stratum which establishes the surface, perimeter or boundary of the ceramic composite. The container and its contents are subsequently placed in a furnace which is supplied with an oxidant, including a vapor-phase oxidant. This setup is heated to temperatures below the melting point of the oxidation reaction product but above the melting point of the parent metal, which for, example, in the case of aluminum using air as the vapor-phase oxidant, is generally between about 850°-1450° C. and more preferably between about 900°-1350° C. Within this temperature interval or preferred temperature range, a body or pool of molten metal forms, and on contact with the oxidant(s), the molten metal will react to form a layer of oxidation reaction product. Upon continued exposure to the oxidizing environment, molten metal is progressively drawn into and through any previously formed oxidation reaction product in the direction of the oxidant and towards the defined surface boundary that is in contact with the permeable stratum. On contact with the oxidant, the molten metal will react to form additional oxidation reaction product while, optionally, leaving metallic constituents dispersed through the polycrystalline material. At least a portion of the oxidation reaction product is maintained in contact with and between the molten parent metal and the oxidant(s) to sustain the continued growth of the polycrystalline oxidation reaction product in the preform. The polycrystalline oxidation reaction product will continue to grow and develop within the preform, embedding its constituents. The process is continued until the oxidation reaction product has grown beyond the defined surface boundary into at least a portion of the permeable stratum to produce an intermediate ceramic body comprising an underlying ceramic composite body that has been infiltrated with the oxidation reaction product and a ceramic stratum that at least partially has been infiltrated with the oxidation reaction product. In conducting the process, it is predetermined for the resulting ceramic stratum to have a mechanical integrity integrity that is weaker or less substantial mechanically than the mechanical integrity of the ceramic composite body. "Mechanical integrity" may be defined as that quality or strength in the respective ceramic structures that allows the ceramic stratum to be removed, such as by grit-blasting, tubling in abrasive media, or slurry erosion technique, without disturbing or disrupting the underlying ceramic composite which stays substantially intact while the ceramic stratum is being removed and after it is removed.

The intermediate ceramic body, comprising the stratum and filler both infiltrated with oxidation reaction product, is removed from the furnace, and is allowed to cool below about 850° C., preferably below about 400° C. to about room temperature. In a preferred embodiment, on cooling, the composite ceramic stratum will develop microcracks in its ceramic matrix due to martensitic phase transformation of stratum constituents entrained within the grown matrix, resulting in the ceramic stratum being easier to remove from the ceramic composite body than if the intermediate ceramic body was not cooled. The microcracked composite ceramic stratum is subsequently removed, such as by an erosion technique, from the ceramic composite body.

The permeable stratum may comprise any material(s), compound(s), or the like, compatible with the growth of the oxidation reaction product matrix therein and has a mechanical integrity after being infiltrated with the oxidation reaction product, that is weaker or less substantial mechanically than the mechanical integrity of the underlying composite body in order that the permeable stratum, including any infiltrated oxidation reaction product, may be easily and preferentially eroded away from or otherwise removed from the underlying composite body without affecting the latter, such as by cracking, pitting, or the like. The permeable stratum also may comprise any material(s), compound(s), or the like, that on post-process cooling develops microcracks due to martensitic phase transformation resulting from the stratum being unstabilized or becoming unstabilized during the oxidation reaction growth process. The composition of the stratum will depend largely on the composition of the preform and the developed ceramic matrix, but also can depend on the oxidant and the process conditions. The materials and reaction conditions are pre-selected so that the infiltraed stratum composite is weaker than the adjacent infiltrated filler composite and that the stratum can be easily separated at the interface. In a preferred embodiment of the invention, utilizing aluminum as the parent metal and air as the oxidant to form an alpha-alumina matrix, the permeable stratum comprises an unstabilized compound selected from the group consisting of zirconia, hafnia, and mixtures thereof. More particularly, if the permeable stratum comprises unstabilized zirconia and the filler alumina, the stratum infiltrated with the alumina oxidation reaction product is mechanically weaker than the adjacent infiltrated bed, and can be readily separated from the bed at the interface by grit-blasting, polishing, slurry erosion, or the like.

The permeable stratum that is positioned contiguously with respect to the defined surface boundary of the preform may be any suitable form or material, such as a coating, bedding, or the like, of platelets, wires, particulates, powders, bubbles, etc., and combinations thereof. The material may be bonded with any suitable binding agent to provide green strength, e.g. polyvinyl alcohol or the like, that does not interfere with the reactions of this invention. Larger particulates having a mesh size of, for example, 24 mesh or larger are particularly useful because of their tendency to form very weak composites. Finer sizes, however, may be employed, including admixtures of mesh sizes. The particulate material or compound of the permeable stratum may be conformed or molded to the preform surface by known or conventional techniques as by forming a slurry of the particulate in an organic binder, applying the slurry to the surface, and then letting the part set as by drying at elevated temperatures.

The resulting self-supporting ceramic composite as the final product is infiltrated or embedded to its boundaries by a ceramic matrix comprising a polycrystalline material consisting essentially of the oxidation reaction product of the parent metal with the vapor-phase oxidant and, optionally, one or more metallic constituents such as non-oxidized constituents of the parent metal, dopants, or metallic constituents of a reducible oxidant. Most typically, the boundaries of the bed of filler or filler preform and of the polycrystalline matrix substantially coincide; but individual constituents at the surfaces of the bed or preform may be exposed or may protrude from the matrix, and therefore infiltration and embedment may not completely surround or encapsulate the filler by the matrix. It further should be understood that the resulting polycrystalline matrix may exhibit porosity which may be a partial or nearly complete replacement of the metal phase, but the volume percent of voids will depend largely on such conditions as temperature, time, type of parent metal, and dopant concentrations. Typically in these polycrystalline ceramic structures, the oxidation reaction product crystallites are interconnected in more than one dimension, preferably in three dimensions, and the metal phase or pore phase may be at least partially interconnected. The ceramic composite product of this invention has generally well-defined boundaries. Thus, the permeable stratum establishes a boundary of the self-supporting ceramic composite and assists in producing a well-defined, net or near net shaped self-supporting ceramic composite.

The ceramic composite obtained by the practice of the present invention will usually be a coherent product wherein between about 5% and about 98% by volume of the total volume of the ceramic composite product is comprised of one or more of the filler materials embedded to the defined surface boundary of the preform or bed with a polycrystalline matrix. The polycrystalline matrix is usually comprised of, when the parent metal is aluminum, about 60% to about 99% by volume (of the volume of polycrystalline matrix) of interconnected alpha-alumina oxide and about 1% to 40% by volume (same basis) of nonoxidized constituents of the parent metal.

Although the present invention is hereinafter described with particular emphasis on systems wherein aluminum or an aluminum alloy is employed as the parent metal and alumina is the intended oxidation reaction product, this reference is for exemplary purposes only, and it is to be understood that the present invention is adaptable by application of the teachings herein to other systems wherein other metals such as tin, silicon, titanium, zirconium, etc., are employed as the parent metal, and the intended oxidation reaction product is that metal oxide, nitride, boride, carbide, or the like. Also, the invention is described below with particular reference to a preform in the formation of composite bodies, but it should be understood that any loose filler beds, materials, or the like, with at least one defined surface boundary are also applicable and useful in the practice of this invention. Thus, whenever "preform" or "permeable preform" is referred to herein, it is to be construed to mean any mass of filler or filler material that is permeable to the vapor-phase oxidant and the oxidation reaction growth process of this invention and has at least one defined surface.

Referring now to the drawing for further describing the invention by way of example only, a parent metal 10 is embedded in a substantially inert filler 12 such that the top surface of the metal is substantially flush with the bedding. A preform 14 having a predetermined shaped surface indicated generally at 16 is placed on the top surface of the parent metal. A permeable stratum 18 is applied to surface 16 without disturbing or upsetting the geometry of this surface. This lay-up is contained in a suitable refractory vessel or boat 20. It will be observed that the assembly is arranged so that the growth or development of the oxidation reaction product will occur into the preform 14 and in a direction towards the defined surface boundary 16. The oxidation reaction product infiltrates or engulfs the preform 14 and at least a portion of the permeable stratum 18. The assembly is heated in a furnace (not shown) to an elevated temperature in the presence of a vapor-phase oxidant as previously described so that the polycrystalline ceramic growth infiltrates the preform beyond the defined surface boundary 16 and into at least a portion of the permeable stratum 18 without substantially disturbing or displacing the preform 14, in order to produce an intermediate ceramic body. The intermediate ceramic body comprises a ceramic stratum (the stratum infiltrated by the polycrystalline ceramic growth) overlaying a ceramic composite body (the preform infiltrated by the polycrystalline ceramic growth). The ceramic stratum exhibits a mechanical integrity that is weaker or less substantial mechanically than the mechanical integrity of the ceramic composite body, and the ceramic stratum may be removed such as by grit-blasting, etc., from the ceramic composite body without affecting the mechanical integrity or structure of the latter. Typically, the intermediate ceramic body is allowed to cool as by removing the lay-up from the furnace before separating the ceramic stratum from the underlying ceramic composite body. Upon removal of the ceramic stratum along the defined surface boundary 16, the resulting ceramic product is a self-supporting ceramic composite having the defined surface established by the permeable stratum 18.

In the process of this invention, the vapor-phase oxidant is normally gaseous or vaporized at the process conditions to provide an oxidizing atmosphere, such as atmospheric air. Typical vapor-phase oxidants include, for example, elements or compounds of the following, or combinations of elements or compounds of the following, including volatile or vaporizable elements, compounds or constituents of compounds or mixtures: oxygen, nitrogen, a halogen, sulfur, phosphorus, arsenic, carbon, boron, selenium, tellurium, and compounds and combinations thereof, for example, methane, ethane, propane, acetylene, ethylene, propylene (the hydrocarbon as a source of carbon), and mixtures such as air, $H_2/H_2O$ and a $CO/CO_2$, the latter two (i.e., $H_2/H_2O$ and $CO/CO_2$) being useful in reducing the oxygen (including air) with air usually being more preferred for obvious reasons of economy. When a vapor-phase oxidant is identified as containing or comprising a particular gas or vapor, this means a vapor-phase oxidant in which the identified gas or vapor is the sole, predominant or at least a significant oxidizer of the parent metal under the conditions obtained in the oxidizing environment utilized. For example, although the major constituent of air is nitrogen, the oxygen content of air is normally the sole oxidizer of the parent metal under the conditions obtained in the oxidizing environment utilized. Air therefore falls within the definition of an "oxygen-containing gas" oxidant but not within the definition of a "nitrogen-containing gas" oxidant. An example of a "nitrogen-containing gas" oxidant as used herein and in the claims is "forming gas", which typically contains about 96 volume percent nitrogen and about 4 volume percent hydrogen.

The oxidant may also include a solid oxidant and/or a liquid oxidant, which is solid or liquid at the process conditions. The solid oxidant and/or the liquid oxidant is employed in combination with the vapor-phase oxidant. When a solid oxidant is employed, it is usually dispersed or admixed through the entire filler bed or preform or through a portion of the bed or preform adjacent the parent metal, in particulate form, or perhaps as a coating on the bed or preform particles. Any suitable solid oxidant may be employed including elements, such as boron or carbon, or reducible compounds, such as oxides, carbides, or borides of lower thermodynamic stability than the oxide or boride reaction product of the parent metal.

If a liquid oxidant is employed in conjunction with the vapor-phase oxidant, it may be dispersed throughout the entire filler bed or preform or a portion thereof adjacent to the parent metal, provided such liquid oxidant does not block access of the molten metal to the vapor-phase oxidant. Reference to a liquid oxidant means one which is a liquid under the oxidation reaction conditions and so a liquid oxidant may have a solid precursor such as a salt, which is molten or liquid at the oxidation reaction conditions. Alternatively, the liquid oxidant may be a liquid precursor, e.g., a solution of a material, which is used to coat part or all of the porous surfaces of the filler bed or preform and which is melted or decomposed at the process conditions to provide a suitable oxidant moiety. Examples of liquid oxidants as herein defined include low melting glasses.

The preform should be sufficiently porous or permeable to allow the vapor-phase oxidant to permeate the preform and contact the parent metal. The preform also should be sufficiently permeable to accommodate growth of the oxidation reaction product within the preform without substantially disturbing, upsetting, or otherwise altering the configuration or geometry of the preform. In the event the preform includes a solid oxidant and/or liquid oxidant which may accompany the vapor-phase oxidant, the preform then should be sufficiently porous or permeable to permit and accept growth of the oxidation reaction product originating from the solid and/or liquid oxidant. It should be understood that whenever "preform" or "permeable preform" is referred to herein, it means a permeable preform possessing the foregoing porosity and/or permeability properties unless otherwise stated.

The permeable preforms may be created or formed into any predetermined desired size and shape by any conventional methods, such as slipcasting, injection molding, transfer molding, vacuum forming, or otherwise, by processing any suitable material(s), more specifically identified and described elsewhere. The permeable preform, as was previously mentioned, may include a solid oxidant and/or liquid oxidant, used in conjunction with a vapor-phase oxidant as the oxidant. The permeable preform should be manufactured with at least one surface boundary, and such as to retain a significant shape integrity and green strength, as well as dimensional fidelity after being infiltrated and embedded by the ceramic matrix. The permeable preform, however, should be permeable enough to accept the growing polycrystalline oxidation reaction product. The permeable preform should also be capable of being wetted by the parent metal, and of such constituency that the polycrystalline oxidation reaction product can bond or adhere to and within the preform to produce a ceramic composite product of high integrity and well-defined borders.

The preform may be of any size or shape, as long as it contacts or is adjacent to or in extended surface contact with the metal surface of the parent metal and has at least one surface boundary with a superimposed permeable stratum which defines a destination for the growing polycrystalline matrix. By way of example only, the preform may be hemispherical in shape with the flat surface boundary in contact with the parent metal surface and the dome-shaped surface boundary representing the defined surface boundary to where the polycrystalline material is to grow; or the preform may be cubical in shape with one square surface boundary contacting the metal surface of the parent metal and the remaining five square surface boundaries being the objective points for the growing polycrystalline matrix. A matrix of the polycrystalline material resulting from the oxidation reaction product is simply grown into the permeable preform and into the stratum so as to infiltrate and embed the preform to its defined surface boundary and at least partially infiltrate the contiguously disposed permeable stratum, without substantially disturbing or displacing the permeable preform.

The permeable preform of this invention may be composed of any suitable material, such as ceramic and/or metal particulates, powders, fibers, whiskers, wires, particles, hollow bodies or spheres, wire cloth, solid spheres, etc., and combinations thereof. The preform materials can comprise either a loose or bonded array or arrangement, which array has interstices, openings, intervening spaces, or the like, to render the preform permeable to the oxidant and the infiltration of molten parent metal to allow for the formation of oxidation reaction product growth without altering the configuration of the preform. The preform may include a lattice of reinforcing rods, bars, tubes, tubules, plates, wire, spheres or other particulates, wire cloth, ceramic refractory cloth or the like, or a combination of any of the foregoing, prearranged in a desired shape. Further, the material(s) of the preform may be homogeneous or heterogeneous. The suitable materials of the preform may, such as ceramic powders or particulate, be bonded together with any suitable binding agent, or the like, which does not interfere with the reactions of this invention, or leave any undesirable residual by-products within the ceramic composite product. Suitable particulates, such as silicon carbide or alumina, may have a grit size of from about 10 to 1000 or smaller or an admixture of grit sizes and types may be used. The particulate may be molded by known or conventional techniques as by forming a slurry of the particulate in an organic binder, pouring the slurry into a mold, and then letting the mold set as by drying or curing at an elevated temperature.

Any of a number of suitable materials may be employed in the formation and manufacture of the preform or filler bed. Such suitable materials include those which, under the temperature and oxidizing conditions of the process, are not volatile, are thermodynamically stable and do not react with or dissolve excessively in the molten parent metal. Some useful filler materials can be provided with a protective coating to render the material stable and to avoid unwanted reactions. Where aluminum is the parent metal and air or oxygen is employed as the oxidant, such materials include, for example, the metal oxides, borides, nitrides, and carbides of aluminum, cerium, hafnium, lanthanum, praseodymium, samarium, zirconium, and higher order metallic compounds such as magnesium aluminate spinel, and coated carbon fibers. Certain of these constituents may have to be coated with an oxidation protective coating in order to survive the oxidizing conditions of the process. In such case, the coating must be compatible with the development of the matrix.

A preform used in the practice of this invention may be employed as a single preform or as an assemblage of preforms to form more complex shapes. It has been discovered that the polycrystalline matrix material can be grown through adjacent, contacting portions of a preform assemblage to bond contiguous preforms into a unified, or integral, ceramic composite. The assembly of preforms, provided with a permeable stratum at the surface(s), is arranged so that a direction of growth of the oxidation reaction product will be towards and into the assembly of preforms to infiltrate and embed the assembly, and the permeable stratum, thereby bonding the preforms together. Thus, complex and shaped ceramic composites can be formed as an integral body which cannot otherwise be produced by conventional manufacturing techniques. It should be understood that whenever "preform" is referred to herein, it means a preform or an assemblage of preforms (unless otherwise stated) which may be ultimately bonded into an integral composite.

As a further embodiment of the invention and as explained in the Commonly Owned Patent Applications and Patents, the addition of dopant materials in conjunction with the parent metal can favorably influence or promote the oxidation reaction process. The function or functions of the dopants can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions.

The dopant or dopants used in conjunction with the parent metal (1) may be provided as alloying constituents of the parent metal, (2) may be applied to at least a portion of the parent metal, or (3) may be applied to the filler bed or preform or to a part thereof, e.g., the support zone of the preform, or any combination of two or more techniques (1), (2), and (3) may be employed. For example, an alloyed dopant may be used in combination with an externally applied dopant. In the case of technique (3) where a dopant or dopants are applied to the filler bed or preform, the application may be accomplished in any suitable manner, such as by dispersing the dopants throughout part of the entire mass of the preform as coatings or in particulate form, preferably including at least a portion of the preform adjacent the parent metal. Application of any of the dopants to the filler may also be accomplished by applying a layer of one or more dopant materials to and within the preform, including any of its internal openings, interstices, passageways, intervening spaces, or the like, that render it permeable. A convenient manner of applying any of the dopant material is to merely soak the filler to be employed in a liquid source (e.g., a solution of dopant material).

A source of the dopant may also be provided by placing a rigid body of dopant in contact with and between at least a portion of the parent metal surface and the preform. For example, a thin sheet of silica-containing glass (useful as a dopant for the oxidation of an aluminum parent metal) can be placed upon a surface of the parent metal. When the aluminum parent metal (which may be internally doped with Mg) overlaid with the silicon-containing material is melted in an oxidizing environment (e.g., in the case of aluminum in air, between about 850° C. to about 1450° C., preferably about 900° C. to about 1350° C.), growth of the polycrystalline ceramic matrix material into the permeable preform occurs. In the case where the dopant is externally applied to at least a portion of the surface of the parent metal, the polycrystalline oxide structure generally grows within the permeable preform substantially beyond the dopant layer (i.e., to beyond the depth of the applied dopant layer). In any case, one or more of the dopants may be externally applied to the parent metal surface and/or to the permeable preform. Additionally, dopants alloyed within the parent metal and/or externally applied to the parent metal may be augmented by dopant(s) applied to the aforementioned forms. Thus, any concentration deficiencies of the dopants alloyed within the parent metal and/or externally applied to the parent metal may be augmented by additional concentration of the respective dopant(s) applied to the preform and vice versa.

Useful dopants for an aluminum parent metal, particularly with air as the oxidant, include, for example, magnesium metal and zinc metal, in combination with each other or in combination with other dopants as described below. These metals, or a suitable source of the metals, may be alloyed into the aluminum-based parent metal at concentrations for each of between about 0.1–10% by weight based on the total weight of the resulting doped metal. Concentrations within this range appear to initiate the ceramic growth, enhance metal transport and favorably influence the growth morphology of the resulting oxidation reaction product.

The concentration for any one dopant will depend on such factors as the combination of dopants and the process temperature.

One or more dopants may be used depending upon the circumstances, as explained above. For example, in the case of an aluminum parent metal and with air as the oxidant, particularly useful combinations of dopants include (a) magnesium and silicon or (b) magnesium, zinc, and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with aluminum parent metal, include sodium, lithium, calcium, boron, phosphorus and yttrium, which may be used individually or in combination with one or more other dopants depending on the oxidant and process conditions. Sodium and lithium may be be used in very small amounts in the parts per million range, typically about 100–200 parts per million, and each may be used alone or together, or in combination with other dopant(s). Rare earth elements such as cerium, lanthanum, praseodymium, neodymium and samarium are also useful dopants, and herein again especially when used in combination with other dopants.

As noted above, it is not necessary to alloy any dopant material into the parent metal. For example, selectively applying one or more dopant materials in a thin layer to either all or a portion of the surface of the parent metal enables local ceramic growth from the parent metal or portions thereof and lends itself to growth of the polycrystalline ceramic material into the permeable preform in selected areas. Thus, growth of the polycrystalline ceramic matrix material into the permeable preform can be controlled by the localized placement of the dopant material upon the surface of the parent metal. The applied coating or layer of dopant is thin relative to the thickness of the parent metal body, and growth or formation of the oxidation reaction product into the permeable preform extends to substantially beyond the dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents, and/or thickeners. More preferably, the dopant materials are applied as powders to the surface of the parent metal or dispersed through at least a portion of the filler. One particularly preferred method of applying the dopants to the parent metal surface is to utilize a liquid suspension of the dopants in a water/organic binder mixture sprayed onto a parent metal surface in order to obtain an adherent coating which facilitates handling of the doped parent metal prior to processing.

The dopant materials when used externally are usually applied to a portion of the surface of the parent metal as to uniform coating thereon. The quantity of dopant is effective over a wide range relative to the amount of parent metal to which it is applied, and in the case of aluminum, experiments have failed to identify either upper or lower operable limits. For example, when utilizing silicon in the form of silicon dioxide externally applied as a dopant for an aluminum-magnesium parent metal using air or oxygen as the oxidant, quantities as low as 0.00003 gram of silicon per gram of parent metal, or about 0.0001 gram of silicon per square centimeter of exposed parent metal surface, together with a second dopant having a source of magnesium and/or zinc, to produce the polycrystalline ceramic growth phenomenon. It also has been found that a ceramic structure is achievable from an aluminum-based parent metal using air or oxygen as the oxidant by using MgO as a dopant in an amount greater than about 0.0008 gram of Mg per gram of parent metal to be oxidized and greater than about 0.003 gram of Mg per square centimeter of parent metal surface upon which the MgO is applied. It appears that to some degree an increase in the quantity of dopant materials will decrease the reaction time necessary to produce the ceramic composite, but this will depend upon such factors as type of dopant, the parent metal, and the reaction conditions.

Where the parent metal is aluminum internally doped with magnesium and the oxidizing medium is air or oxygen, it has been observed that magnesium is at least partially oxidized out of the alloy at temperatures of from about 820° C. to 950° C. In such instances of magnesium-doped systems, the magnesium forms a magnesium oxide and/or magnesium aluminate spinel phase at the surface of the molten aluminum alloy, and during the growth process such magnesium compounds remain primarily at the initial oxide surface of the parent metal alloy (i.e., the "initial surface") in the growing ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing, or grit-blasting.

The invention is further illustrated by the following example.

EXAMPLE

A one inch thick by seven-eighth inch wide by eight inch long ingot of aluminum alloy comprising 5% silicon, 3% magnesium, 91.7% aluminum, balance impurities, all by weight, is placed horizontally upon a layer of relatively inert material of 38 Alundum, 100 mesh size (by Norton Company), contained within a crucible. The ingot is subsequently covered with a preform having a defined surface boundary. The preform may be fabricated by conventional slip casting technique, and is made from a slurry comprising 47.6% alumina particles (E67 Alundum, from Norton Co., 1000 mesh size), 23.7% Kaolin clay (EPK, Georgia Kaolin, 98% less than 20 um particle size) and 28.5% water, is mixed uniformly, and poured into a plaster of paris mold having the desired geometry of the preform. The crucible preform is cast for approximately 20 minutes, dried at 90° C. and then prefired at 700° C. for 30 minutes in air. The preform is covered with zirconia, for example 24 mesh, at its defined surface boundary to a depth of approximately three inches. The lay-up is placed in a furnace (vented to allow for the flow of air), which is at 1000° C. and is held there for 96 hours to produce a ceramic composite body overlaid with zirconia stratum that is infiltrated with oxidation reaction product. The zirconia stratum exhibits a mechanical integrity weaker than a mechanical integrity of the ceramic composite body. After cooling, the zirconia stratum is removed by grit-blasting to produce a self-supporting ceramic composite having the defined surface boundary established by the zirconia stratum.

What is claimed is:

1. A method for producing a self-supporting ceramic composite body comprising a mass of filler material infiltrated by a ceramic matrix, said ceramic matrix being obtained by the oxidation of a parent metal to form a polycrystalline matrix comprising an oxidation reaction product of the parent metal, said method comprising:

(A) heating a parent metal to a temperature above its melting point but below the melting point of its oxidation reaction product to form a body of molten metal;

(B) contacting said body of molten metal with a permeable mass of filler material having at least one surface bearing a stratum, thereby forming an interface between the molten metal and the filler material, said stratum (a) substantially conforming to the geometry of at least a portion of said at least one surface of said mass of filler material, (b) being permeable to a vapor-phase oxidant, (c) comprising an unstabilizable material, and (d) being permeable to infiltration by growth of the oxidation reaction product, and said stratum being at least partially spaced from said interface such that formation of said oxidation reaction product will occur into said mass of filler material and in a direction toward and at least partially into said stratum; and at said temperature:

(i) reacting said molten metal with an oxidant to form an oxidation reaction product, (ii) maintaining at least a portion of said oxidation reaction product in contact with and between said molten metal and said oxidant, to progressively transport molten metal through the oxidation reaction product toward the oxidant so that fresh oxidation reaction product continues to form at an interface between said oxidant and previously formed oxidation reaction product that has infiltrated said mass of filler material to produce a ceramic composite body, and (iii) continuing said reacting to infiltrate at least a portion of said stratum with said oxidation reaction product to produce a ceramic stratum overlaying said ceramic composite body; and (C) recovering a self-supporting ceramic composite body having said at least one surface established by said stratum.

2. The method according to claim 1, further comprising shaping said filler material into a preform.

3. The method according to claim 1, wherein said filler material further comprises at least one material selected from the group consisting of solid and liquid oxidants.

4. The method according to claim 1, further comprising introducing said stratum in a manner sufficient to result in said ceramic stratum which possesses a mechanical integrity that is less than said ceramic composite.

5. The method according to claim 1, wherein said stratum comprises a loose bedding.

6. The method according to claim 1, wherein said stratum comprises a coating.

7. The method according to claim 1, wherein said parent metal comprises at least one material selected from the group consisting of aluminum, tin, silicon, titanium, zirconium, and hafnium.

8. The method according to claim 1, wherein said stratum comprises at least one material selected from the group consisting of zirconia and hafnia.

* * * * *